(12) United States Patent
Barker

(10) Patent No.: US 7,080,983 B2
(45) Date of Patent: Jul. 25, 2006

(54) FLIPBOOK FOR MAKING WORDS ACCORDING TO ORTHOGRAPHIC PATTERNS

(76) Inventor: Kenneth Craig Barker, 15660 Cranbrook St., San Leandro, CA (US) 94579

( * ) Notice: Subject to any disclaimer, the term of this patent is extended or adjusted under 35 U.S.C. 154(b) by 311 days.

(21) Appl. No.: 10/608,977

(22) Filed: Jun. 28, 2003

(65) Prior Publication Data
US 2005/0042583 A1   Feb. 24, 2005

Related U.S. Application Data

(60) Provisional application No. 60/393,441, filed on Jul. 2, 2002.

(51) Int. Cl.
*G09B 17/00* (2006.01)
(52) U.S. Cl. .................. 434/167; 434/172; 434/178
(58) Field of Classification Search ............... 434/156, 434/159, 171, 173, 178, 167, 172
See application file for complete search history.

(56) References Cited

U.S. PATENT DOCUMENTS

| | | | | |
|---|---|---|---|---|
| 3,214,848 A | * | 11/1965 | Van Eycke | 434/159 |
| 3,674,905 A | * | 7/1972 | Collins, Sr. | 434/174 |
| 4,515,566 A | * | 5/1985 | Sprague | 434/172 |
| 5,788,503 A | * | 8/1998 | Shapiro et al. | 434/172 |

* cited by examiner

*Primary Examiner*—Dmitry Suhol

(57) ABSTRACT

An educational device, such as a flipbook, is designed and utilized with an instructional methodology for teaching students about the structure of written words. The orthographic patterns found in English single-syllable words and syllables are shown using color-coded sets of pages, each imprinted with a letter or letter cluster comprising vowels, r—controlled vowels, vowel teams, initial and final consonants and consonant digraphs, initial and final consonant blends, or either of two silent es—"marvelous e" and "not so marvelous e." Sets of prefix and suffix pages are also used, along with a schwa page, to indicate the sound of an unaccented vowel. Like letters, or letter clusters, can be substituted for each other in flipbook fashion, consonants for consonants and vowels for vowels, so that by rotating various flipbook pages, hat can be changed to hot, or hop, or chop.

3 Claims, 5 Drawing Sheets
(5 of 5 Drawing Sheet(s) Filed in Color)

FLIPBOOK FOR MAKING WORDS ACCORDING TO ORTHOGRAPHIC PATTERNS

CROSS-REFERENCE TO RELATED APPLICATIONS

The applicant claims the prior benefit of Provisional Pat. No. 60/393,441, issued Jul. 2, 2002, regarding this invention.

BACKGROUND

1. Field of Invention

This invention relates to educational devices, specifically to instructional tools and their corresponding methodologies for teaching students to read and write, more specifically to instructional tools and methodologies which facilitate students' learning about the structural aspects of using alphabetic letters within written words.

2. Discussion of the Problem

Learning to read is the most important academic skill a student is expected to master. Nearly all curricular subjects require that a student can read and write proficiently. Yet, in his 1998 statement before the U.S. Senate Committee on Labor and Human Resources, Dr. G. Reid Lyon, Chief of the Child Development and Behavior Branch of the National Institute of Child Health and Human Development, asserted that for many students, "reading is one of the most difficult tasks that they will have to master throughout their schooling."

Owing in large part to this difficulty, literacy instruction has been controversial in this country. Educators have been seen to try numerous instructional approaches and books like *Why Johnny Can't Read and What You Can Do About It* have achieved best-seller status. The federal government commissioned three large-scale studies, seeking to find the most effective methodologies for teaching students to read and write. The "First Grade Studies," *The Cooperative Research Program in First Grade Reading* (Bond & Dykstra, 1967) published data collected from classrooms across the country, including some longitudinal studies which lasted through the third grade. *Beginning Reading Instruction in the United States* (Adams, 1990) is a review of the research literature found in educational journals and books to that date. And in 2000, the National Reading Panel published *Teaching Children to Read: An Evidence-Based Assessment of the Scientific Research Literature on Reading and Its Implications for Reading Instruction*. All three of these arrived at the same basic conclusions. Among these are that combinations of the widely-used types of instruction generally produce the best student outcomes, and that systematic phonics instruction is an essential component of such a curriculum.

A combination approach to literacy instruction generally assures that written words will be studied, both as whole units and as compilations of alphabetic letters which have been blended together. Phonics instruction teaches the alphabetic principle, that the individual sounds within spoken words (phonemes) are represented by letters and letter groupings (graphemes) when written. An instructional difficulty, though, is that some phonemes like ā can be represented by a number of different graphemes i.e. ate, eight, bait, and bay, just as ē is represented differently in seek, heat, Pete, receipt, and me.

English is a highly eclectic language. It has borrowed words from Latin, Anglo-Saxon, Norman, Greek, Spanish, French, etc. to form the largest vocabulary currently spoken, over 600,000 words; larger than our closest rival, German, by two thirds. Each of these root languages has its own orthographic system for representing phonemes with graphemes in written words. Therefore, English orthography is necessarily complex—seeking to accommodate words from each of these other systems. Even with an enlarged orthography, some or our written words are simply termed, "nonphonetic." V<u>ote</u>, n<u>ote</u>, h<u>ope</u>, and c<u>ove</u> for instance, utilize a long ō and a silent e. Love, however, has the same orthographic structure but is not pronounced, lōve. This is one of the principle reasons many American students face such a difficult challenge in becoming literate. An adult, recounting his problems in fourth grade said, "If you asked me how words are put together—my honest, best answer would have been to take a bunch of letters and throw them up into the air. When they land, some of them will spell words."

Along with letter/sound relationships, phonics instruction generally covers word families like _at i.e. hat, fat, mat, cat, and sat, and_op i.e. mop, pop, top, and hop. There is some division, however, among many educators regarding phonics instruction. Synthetic phonics starts with single letters and teaches students to blend their sounds together to arrive at written words, in a parts-to-whole approach. Analytic phonics starts with whole words, students are familiar with, and teaches them both to analyze their componant parts and to recognize similarities among other words in word-sort exercises, etc., in a whole-to-parts approach. Parts to whole is an inductive process while whole-to-parts is a deductive process. The applicant asserts that students are encouraged to engage in both types of thinking when utilizing the present invention. The importance of this will be discussed later in this application.

Within the past decade or so, an increasing number of educators have stressed that the orthographic structure of how written words are comprised should also be taught, by illustrating the principle of substitution, since knowing prevalent word families can only take students so far. Numerous educational authors refer to CVC words, consisting of an initial consonant, a vowel, and a final consonant i.e. cat, dog, run, and pet. Cunningham's "Four Blocks Program" has such a spelling-based approach to phonics instruction. Calfee's "Meta-Phonics" terms the vowels in CVC words, "glue letters." Clay's popular "Reading Recovery" program utilizes movable plastic letters in "Making and Breaking" exercises which teach students about blending and segmenting the phonemes and graphemes within spoken and written words, Steed's Touchphonics™ system teaches that consonants can be substituted for like consonants and vowels substituted for like vowels, to form different words or syllables which yet retain the same orthographic pattern. Therefore, cat can be changed to <u>h</u>at, hat can be changed to h<u>o</u>t, and hot can be changed to ho<u>p</u>. While making these changes, the CVC pattern of consonant-vowel-consonant, remains. This is a more abstract way of viewing written words and their alphabetic letters than just learning sound/symbol relationships and word families. A number of educational authors, Pressley ( ), Adams ( ), and Routman ( ), for instance, continue to urge that more effective instructional tools and strategies be developed to help students rapidly and deeply gain key insights which support learning to read and write.

Literacy is a complex field of learning. One reason reading instruction is fraught with such difficulty is that becoming literate requires some fundamental understandings. However, certain rudimentary literacy activities can be performed without those understandings—at least a firm grasp of them. Because of this, one pitfall a number of students face at one or more stages in their development is that literacy instruction, and its related activities, very quickly changes from being relatively easy to almost impossibly difficult. An educational device and instructional methodology is, therefore, needed which not only encourages students to view written words both as whole units and as compilations of their alphabetic letters, but also supports their gaining essential understandings at various stages of their early literacy development.

To assist struggling students' learning fundamental literacy concepts, Steed (1998), Hisks (1993), Terry (1996), and others teach additional English orthographic patterns, beyond CVC. This helps clarify the orthography of written words in English by showing students how the structural parts of more complex words interact. Steed developed the Touchphonics™ instructional system, which utilizes plastic letters. These have three important features, among others. Firstly, letters and letter groupings are color-coded according to their orthographic function and placement within written words. Secondly, letter groupings are conjoined. The letters comprising vowel teams like ea, ai, oo, etc. are attached to each other, and colored red. Initial consonant blends like bl, spr, tw, sk, etc. are also conjoined and colored blue. Final consonant blends like lf, nch, and mp are conjoined and colored green. Prefixes (orange) and suffixes (purple) also consist of conjoined letters, encouraging students to view them as unitary forms rather than groups of unrelated letters. Thirdly, Steed outlined a program of instruction which covers all the English orthographic patterns normally taught, not just the CVC pattern.

An example of the importance of these features can be seen in a student this applicant is currently teaching. Aside from words which he has memorized, said student has great difficulty reading words which contain consonant blends. He knows short vowel sounds and the sounds represented by individual consonants. He has demonstrated the ability to easily substitute letters within CVC words, changing pet to pat, to hat, to has, etc. Yet, combining the sounds within consonant blends—and joining them with other graphemes in CCVC, CVCC, and CCVCC words is problematic for him. Reading words like fled, mast, and sprung is currently beyond his ability.

The applicant has developed an instructional program termed, Modular Orthography, which utilizes an educational device, such as a flipbook, to illustrate words according to their orthographic patterns. It highlights the structural characteristics of English orthography, encouraging students to gain fundamental understandings regarding how spoken words are transposed to their written form. The instructional methodology for using said flipbook teaches the orthographic patterns found in written English, however, along with a simplified system of color-coding, this applicant teaches orthographic patterns in a different order than Steed's Touchphonics™ system. This educational device has features which make it an improvement over prior art.

BACKGROUND—DISCUSSION OF PRIOR ART

There are numerous examples of flipbooks used as educational devices. Lakeshore®, a fairly representative commercial clearing house for educational products, offers seven examples of flipbooks in their 2003 catalog. Among these are the "Alphabet Sounds Giant Flip Book" (AA344) and the set of "Phonics Flip Books" (AA902). The "Phonics Flip Books" set consists of thirty four flipbooks—each highlighting a specific orthographic feature like vowel teams, initial or final consonant blends, digraphs, short or long vowels, etc. with a partial word written on a backing board and individual examples of the highlighted orthographic feature on flipbook pages which can be rotated about a top binding. Each flipbook page completes a different word when viewed in conjunction with the partial word written on the backing board. Each of said flipbooks allows students to make seven or eight representative words by rotating individual flipbook pages about the top spiral binding. Rather than highlighting generalized structural patterns, however, this set of flipbooks illustrates specific orthographic features. Using this method of construction and instruction, numerous flipbooks only illustrate a relatively few written words to students.

Other types of instructional devices are advertised in the Lakeshore® catalog, which can be utilized to teach students about the structural patterns of English orthography. Part of the written description stated for the "A–Z Classroom Letter Center" (TT212) is, "From sequencing the alphabet and building letter recognition to forming simple CVC words— kids can do it all with our versatile, hands-on center!" The above device consists of six sets of the alphabetic letters and their storage containers, however, no color-coding or other indicia is imprinted on the plastic letters, besides matching the colors of said letters with the colors of their respective containers. None of the plastic letters are conjoined, to form letter clusters.

"Phonics Magnets—Complete Set" (RR480X), has individual magnetic pieces with letters and letter clusters imprinted on them. Color-coding differentiates between vowels and consonants, highlighting the orthographic structure of written English words for students as they manipulate the magnetic pieces to form said words. Silent letters and nearly silent letters, however, are not color-coded; neither are prefixes or suffixes. Both of the above instructional devices require a lot of space to spread out and manipulate their alphabetic letters and individual pieces are prone to becoming lost or separated from their set.

Utilizing the format of a flipbook to illustrate the structural patterns of written words offers features not found with other types of instructional devices. It affords both compactness and is less prone to having individual pieces lost, as indicia are imprinted on sets of pages which are attached to a backing board by means of a binding, yet the pages can be manipulated much as individual items, such as letters or letter clusters, would be. A further advantage inherent in a flipbook is that it can demonstrate that different letters or letter clusters can be substituted for each other within words, by rotating its pages about a binding—thus revealing another page in place of the first. This can be done in the same manner as in the use of a humorous figure flipbook, having a side binding and top, middle, and bottom sets of pages. If one starts with a picture of a ballerina, one can rotate bottom pages to replace her dainty feet with fire fighter's boots, and one can rotate top pages to replace her head with a gorilla's; so that by rotating pages one has formed a picture of a gorilla, in a ballerina's tutu, wearing fire fighter's boots. Head, body, and feet can be changed, however, the figure's pattern is preserved. One cannot put the feet where the body should be, or the head where the feet should be. Such is the limitation and utility of a flipbook.

*I Can Spell: Words with Three Letters* (Nilsen, 1998) is a flipbook, having top and bottom bindings. Three sets of pages, each page having an alphabetic letter imprinted on it, are attached to the top binding. Three sets of smaller pages, each page having a picture of a cat or dog or hut or pin, etc. which can be spelled with three letters, are attached to the bottom binding. The top bound and bottom bound pages do not overlap each other. The bottom bound pages are meant to provide cues for a student's spelling a word, using the top bound pages. However, the left, middle, and right sets of top bound pages each contain all twenty six letters of the alphabet. Therefore, students are not limited to spelling only CVC words. This surrenders the patterning which a flipbook can enforce in the same way as if the previously discussed figure flipbook had head, body, and feet pages indiscriminately placed within its top, middle, and bottom sets of pages. Also, there is no apparent color-coding within *I Can Spell: Words with Three Letters*. While the alphabetic letters of the top bound left, middle, and right pages are imprinted with bright colors, vowels and consonants are not consistently colored differently than each other.

For the purpose of teaching students the structuralism of English orthography, that is for illustrating how alphabetic letters fit together within written words, *I Can Spell: Words with Three Letters* is an improvement over other flipbooks which only show a letter on one page and an object whose name starts with that letter, on a corresponding page. A further improvement is found in U.S. Pat. No. 5,788,503 of Shapiro et al. which teaches the construction and use of an educational device, such as a flipbook, for illustrating written words which its inventors term "tri-grams," consisting of a consonant, followed by a vowel, followed by another consonant. Their claims relate to a flipbook, with a binding along one edge, having groups of pages which can be rotated about the binding independently of other groups of pages. Each page has, imprinted upon it, an alphabetic letter and indicia, consisting of a picture of an object and its name written, to assist students with the sound (phoneme) represented by the letter (grapheme). No color-coding is mentioned in the claims, however in one of the embodiments described, "color-coding relates to left-to-right sequencing only," where the initial letter of a word is colored green and the final letter is colored red, "primarily designed for dyslexics who have trouble with left-to-right sequencing."

Three other features should be mentioned. Firstly, provisions are made in alternate embodiments for up to five sets of flipbook pages, arranged so that their letters appear in a readable fashion. Also, the use of both single and double letters is provided for, so that consonant blends, digraphs, and vowel teams can be represented within the words illustrated by such a flipbook. Secondly, in another embodiment, holders are provided for removable pads of pages, rather than having a binding or bindings which attach all flipbook pages to a single backing board. Thirdly, in yet another embodiment both top and bottom bindings are provided on a flipbook designed to illustrate written Hebrew words. The top binding is for sets of top pages showing letters, and the bottom binding is for bottom pages with vowel indicia—thus allowing the letter on a top page to be read either as a vowel or a consonant.

In a drawing illustrating the first of these features, four sets of pages are shown on a mounting apparatus spelling out the word, growth. The first page shows the initial consonant blend of gr. The final page shows the consonant digraph, th. The two middle pages show o and w, respectively, rather than the vowel team, ow, on a single page. The vowel teams, aw, ew, and ow are contained within the set of vowel teams in the applicant's present invention. While making and altering various words, using the applicant's flipbook, such a confusion would be physically impossible to arrive at. This applicant asserts that one of the advantages of his invention is the ability to illustrate most (if not all) phonetically spelled, single syllable English words and syllables—and with the additional use of the "not so marvelous e," many nonphonetic English words can be illustrated as well. With the color-coding and mechanical design described herein, all these written words are shown to adhere to distinct orthographic patterns. Concerning orthography, a wise teacher has cautioned, "Never teach confusion to students!" That the applicant's invention, therefore, does not allow one to utilize multiple single consonants in the place of a consonant blend or digraph, or to split up a vowel team, etc., is an important improvement over prior art.

SUMMARY

The applicant asserts that the color-coding and mechanical design of the present invention is an improvement over the above mentioned educational device and all others he has encountered. None of the examples in prior art provide such a compact, yet comprehensive, educational device for teaching students about the orthographic patterns within English orthography, as the invention this applicant seeks a patent for. The applicant has found that introducing students to the notion of structuralism, regarding written words, is an effective form of reading and spelling instruction, and that the present invention has supported numerous students' growth in literacy. So far as this applicant knows, the color-coding and mechanical design of the preferred embodiment of the present invention is unique. Also, the terms and concepts of, "nearly silent letters," "marvelous e," and "not so marvelous e" are original with this applicant.

OBJECTS AND ADVANTAGES

The applicant has found that color-coding and the kinesthetic movement of orthographic elements found in the present invention, are important to many students in helping them conceptualize the structural patterns of written English words, and in their deeply understanding fundamental orthographic principles which support literacy.[1] The color-coding of vowels and consonants highlights their patterning within words and helps to obviate their various orthographic functions. Other color-coding for silent letters and nearly silent letters is suggestive of their orthographic effects. That prefixes and suffixes are yet another color is educationally purposeful, as students encounter most of these so frequently that they are memorized as unitary strings of letters, rather than clusters of consonants and vowels which should be repeatedly analyzed.

The kinesthetic movement of covering top bound single consonant pages with side bound consonant blend pages (positioned out of sight—behind the backing board when not in use) suggests that the sounds of those letters should be blended as a unit, and that this blended unit replaces the function of a single consonant within a written word. Having established this kinesthetic relationship, that the consonant digraphs th, ch, sh, wh, ph, and gh are found among the single consonant pages is instructionally meaningful, as these letter clusters orthographically function the same as single letters Also, that vowel team pages do not cover single vowel pages, but are included within their set, implies a different relationship than that of single consonants and consonant blends. The act of attaching or removing a silent e page kinesthetically illustrates that letter's effect on various other letters. Additionally, that a "marvelous e" or "not so marvelous e" page fills this function, further delineates the role of silent e. Physically holding the "schwa page" over a single vowel page, as an indicator that the vowel is unaccented (therefore, representing an /ŭ/ sound, no matter what letter is used) within a given word, is another kinesthetic element which helps students retain proper spellings in their memory. Attaching or detaching the set of prefix pages in the left receptacle and suffix pages in the right receptacle makes certain orthographic conventions obvious to students, for instance that one cannot have both a silent e page and the set of suffix pages attached, at the same time, to the right receptacle.

Against the foregoing background, it is a primary object of the present invention to provide teachers and students with an educational device, such as a flipbook, and an instructional methodology for utilizing it, which illustrates the orthographic structure of written words in English. Additional advantages and objects of the present invention are:

(a) to provide an educational tool and methodology which supports students' learning the orthographic functions of alphabetic letters, including the generalized differentiation between vowels and consonants, and the structural use and characteristics of consonant blends, silent e, silent letters, r-controlled vowels, and vowel teams, etc. within written words;

(b) to teach the generalized orthographic patterns of CVC, CCVCC, CVCe, CV, VC, XCVC, and CVVC, along with r-controlled vowels, the addition of prefixes and suffixes, and the schwa effect on unaccented vowels;

(c) to provide an instructional tool and methodology which facilitates teachers' promoting a structuralist view of orthography among their students, to help them gain fundamental understandings which are essential to their growth in literacy;

(d) to provide an instructional tool and methodology which illustrates the abstract conventions of English orthography at a fairly concrete level, using its color-coding and kinesthetic design features, thus encouraging students to experiment with and intuitively formulate their own rules for numerous orthographic features found in single-syllable words and syllables;

(e) to provide an instructional tool and methodology which supports and utilizes both. synthetic and analytic phonics instruction—encouraging students to examine and work with written words in both an inductive, parts-to-whole manner and a deductive, whole-to-parts manner;

(f) to provide an instructional tool which not only illustrates, but also logically supports the letter/sounds found in most (if not all) phonetic words, and many nonphonetic words;

(g) that said instructional tool should be both compact and comprehensive, concerning its ease of use and application to the curricular needs of phonics and spelling instruction;

(h) that said instructional tool should utilize the movement, ordering, and attachment features of a flipbook, so that pages imprinted with letters or letter clusters are able to be rotated about their bindings, to kinesthetically illustrate the orthographic relationships of said letters and letter clusters, revealing patterns—as the bindings of flipbook pages will only allow certain configurations, and being less subject to the loss of individual pieces than plastic letters, etc. because of said bindings;

(i) that said instructional tool should also utilize color-coding, which further highlights orthographic patterns and other features among said letters and letter clusters imprinted on its pages;

(j) that additional flipbook and single pages should be able to be attached to, or otherwise used in conjunction with the main body of the flipbook, to illustrate orthographic patterns and features;

(k) that index tabs, facing front and back, should make locating individual pages, within sets of pages, easy for teachers and students;

(l) that the arrangement of said pages, with their specific letters or letter clusters imprinted thereon, should be such that if one knows the proper spelling of a word, one cannot form it in a way which is orthographically confusing to students.

Additional objects and advantages may become apparent to the reader of this patent application. The applicant stresses that the spirit of the above objects and advantages also apply to alternate embodiments of the invention i.e. flipbooks designed to illustrate the orthographic structure of words written in other languages like Spanish or French, or computer, video, or other means of showing and manipulating letters and letter clusters—having a similar format for color-coding, kinesthetic design, and instructional methodology.

DESCRIPTION OF THE DRAWINGS

The file of this patent contains at least one drawing executed in color. Copies of this patent with color drawing(s) will be provided by the Patent and Trademark Office upon request and payment of the necessary fee.

NUMERALS REFERENCED IN ALL FIGURES

Figure 1:
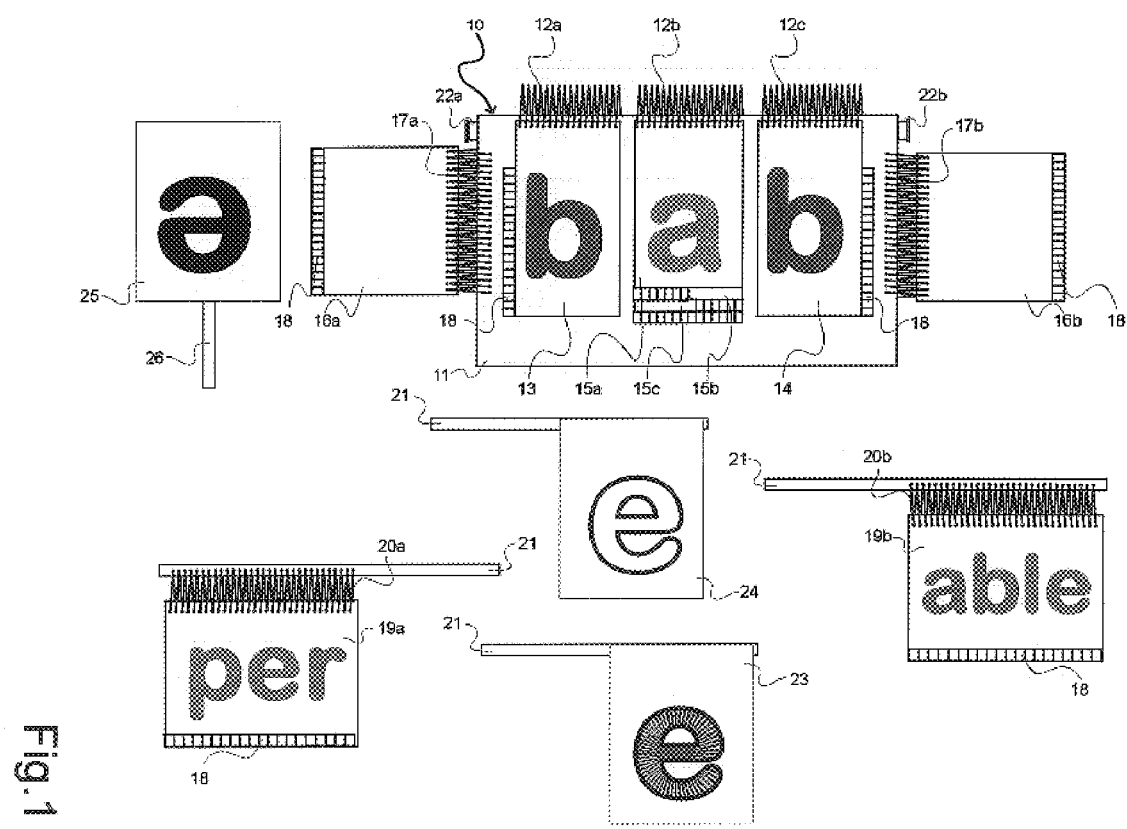
FIG. 1 is a plan view of the invention, showing all its component parts. The color-coding is an essential feature.

10: Assembly of Flipbook for Making Words According to Orthographic Patterns
11: Backing board
12*a*: Left top spiral binding
12*b*: Center top spiral binding
12*c*: Right top spiral binding
13: Initial consonant pages
14: Final consonant pages
15*a*: Single vowel pages
15*b*: r controlled vowel pages
15*c*: Vowel team pages
16*a*: Initial consonant blend pages
16*b*: Final consonant blend pages
17*a*: Left side spiral binding
17*b*: Right side spiral binding
18: Page index tabs
19*a*: Prefix pages
19*b*: Suffix pages
20*a*: Prefix pages spiral binding
20*b*: Suffix pages
21: Attachment rod
22*a*: Left receptable for attachment rod
22*b*: Right receptacle for attachment rod
23: Marvelous e page
24: Not so marvelous e page
25: Schwa page
26: Handle for schwa page

DEFINITION OF TERMS

Phoneme—An individual speech sound; the smallest units within orally spoken words.

Grapheme—The written representation of a phoneme by an alphabetic letter or group of letters. As orally spoken words are a compellation of phonemes which are blended together, written words are structurally formed by using graphemes to represent those phonemes according to overarching orthographic convention.

Phonics methodology—A way of teaching reading and spelling which stresses symbol-sound relationships. It is largely an inductive, bottom-up, parts-to whole approach to teaching literacy skills which is systematic and hierarchical in nature. On the other hand, whole word methodologies are more deductive, top-down, whole-to-parts. Synthetic phonics—is instruction which teaches sound-symbol correspondences before introducing written words. Such instruction emphasizes that phonemes (individual speech sounds) are represented by various graphemes (letters and letter groups). Students are taught that just as words can be segmented into their component phonemes, written words can be decocded or spelled through the blending of graphemes. Analytic phonics emphasizes onsets and rimes, the initial and final "chunks" used within similar words. An example of this process is a student's using the initial /cr/ as in creep and crop along with /ook/ as in book, look, and took, to form "crook."

Synthetic phonics—A parts-to-whole phonics approach to reading instruction in which the student learns the sounds represented by letters and letter combinations, segmenting and blending skills are then used to "sound out" written words. Thus graphemes (representing phonemes) are seen to be linked together to form recognizable words in a bottom-up manner. Understanding small bits of information the sounds represented by their orthographic organization) leads to the recognition of complete words.

Analytic phonics—An approach to word study in which the student is first taught a number of sight words and then uses onsets and rimes to learn about other similar words. It is somewhat deductive in nature and, thus, similar to some aspects of whole word methodologies in directing study from the whole word to its parts. The parts, however are "chunks" of letters rather than individual graphemes, as in r at, fat, mat, cat, and hat. This chunking is sometimes called working with word families.

Onset—The consonant(s) preceding the vowel in a syllable or word.

Rime—The vowel or vowel team and following consonant(s) in a syllable or word, as /ook/ in book, brook, and t ook.

Word study—As used in this study, it is the structural analysis of words.

Word sort—A popular form of word study which encourages students to view the structural elements of words, as well as develop their vocabularies. This is often done with word cards which are sorted and grouped according to various categories.

Alphabetic principle—The knowledge that, using an alphabetic system, speech sounds (phonemes) can be represented by letters or groups of letters (graphemes) in a systematic way. In an idealized situation graphemes and phonemes would have a strict one-to-one correlation.

Sound/symbol correspondences—The written representations of speech sounds, as /f/ in the initial sound of "fun" and /i/ for the second sound in "kitten."

Blending—The understanding which allows a student to combine the sounds (phonemes) represented by letters (graphemes) to pronounce a word; "sounding it out."

Segmentation—The understanding which allows a student to segment or break apart a word into its syllables or (more advanced) its component phonemes.

Inclusion—That additional letters can be included in a word to alter it, as in changing pan to plan by adding /l/, or changing plan to plane by adding /e/.

Substitution—That any letter can be exchanged for a like letter (consonants for consonants and vowels for vowels) within an orthographic pattern. The result may be a "nonsense word" or syllable, but it will still be orthographically correct for that pattern. As an example, hat is a [CVC] word. Its pattern is consonant-vowel-consonant. One can substitute any consonant for /h/ in the initial—or /t/ in the final consonant positions. This may result in a word which is not used in the English language but it will still adhere to the [CVC] orthographic pattern. Likewise, any vowel could be substituted for /a/ in the middle position. An understanding of this principle is vital to, but also reinforced by, a modular approach to orthographic instruction.

Interdependence—That the sound a letter represents within a word is sometimes dependent upon its relationship to other letters within that word. As an example, the /e/ at the end of sage causes the /a/ to be pronounced as a long vowel sound and /g/ to sound like /j/. Without that final /e/, sag would have a short vowel sound and a hard /g/.

Orthography—Relating to the use and conventions of symbols in a written language. One might say that it relates to the structural mechanics of how symbols are used within a written language.

Orthographic principles—Essential understandings which must be mastered in order for a student to successfully utilize orthography. This is not to say that one cannot read or write without a working familiarity with all orthographic principles. Memorization, guessing regarding word shapes, and relying on contextual cues can help students achieve a limited degree of literacy. However, whether a student is explicitly taught the principles of orthography or not, if these understandings are not thoroughly internalized, that student will lack a solid foundation for literacy (Lyon, 1998; Pressley, 1998; NICHD, 1998). Only tenuously understanding the structural aspects of how words are written will always lend an uncomfortable lack of surety to reading and writing tasks (Adams, 2001). If one takes the view that students must gain insights regarding orthographic principles in order to be proficient in their literacy, a major difference between instruction which has code-based components and instruction which does not is how much these students will have to figure out on their own. It also leads to questions regarding the relative efficacy of different types of code-based instruction in facilitating those insights.

Orthographic understandings—Knowledge which allows one to use a written language, successfully observing its rules and conventions. With regards to this study, it is facility in reading and writing the English language from a structural—rather than meaning related point of view. This is not to say that one must be able to state formalized rules in order to possess orthographic understandings. As Henderson (1990) asserted, competent readers can't enunciate how they read, they simply do it.

Nonphonetic word—A word which is spelled in a way which is inconsistent with the alphabetic principle. In other words, its spelling does not reflect its pronunciation. Examples of these are "mōld" (no silent /e/ at the end to make the vowel long), "tall" (pronounced as if the vowel were a short /o/), and "thĕ." The [CV] pattern (Remember that /th/ is a consonant digraph which acts as a single letter.) regularly produces a long vowel sound. When preceding a word that begins with a vowel, "thē" (as used) is a phonetically regular word. "Thē elephant," follows orthographic convention. The majority of the time, however, "thē" precedes words beginning with consonants and is pronounced as if it had a short /u/ as in "up." In these cases it is considered nonphonetic.

Inductive reasoning—The logical process of determining overarching principles in a parts-to-whole fashion; i.e. this, and this, and this, are similar in some manner—therefore they substantiate a regular pattern. An application of this is the use of small component bits of information to arrive at a larger or more abstract bit of information, as in decoding graphemes and blending the sounds they represent to decode an entire written word.

Inductive method—A teaching/learning method in which specific examples are first examined to identify a common characteristic and then used to develop a generalization or rule. A phonics approach that gives many examples of a phonic pattern before arriving at the phonic generalization utilizes an inductive method.

Deductive reasoning—The process of logical reasoning from a principle or generalization to specific instances; reasoning from whole-to-parts. An application of this process is starting with a known word in its written form, and then gleaning insights into orthographic conventions by considering its structure and component parts, in much the same way as reverse engineering seeks to take a finished product and try to determine how it was built.

Deductive method—A teaching/learning method in which a generalization or rule is first considered and then applied to specific examples to bear up that rule.

DESCRIPTION OF THE INVENTION

FIG. 1 shows a preferred embodiment of the invention. This consists of a flipbook 10 with pages which are spiral bound, for instance spiral bound, to the top 12a, 12b, 12c and sides 17a, 17b of a backing board 11. The backing board also has left 22a and right 22b receptacles for attachment rods 21. An attachment rod 21 enables spiral bound (20a) prefix pages 19a to be affixed to the left side of the flipbook, via the left receptacle 22a. An attachment rod 21 enables spiral bound (20b) suffix pages 19b to be affixed to the right side of the flipbook, via the right receptacle 22b. Two other like attachment rods enable single "silent e" pages to be affixed to the right side of the flipbook. Accordingly, an attachment rod 21 enables the marvelous e page 23 to be affixed to the right side of the flipbook, via the right receptacle 22b or the not so marvelous e page 24 can be attached to the right side of the flipbook in a like manner. The schwa page 25 can be displayed (handheld) above and just aft of the flipbook, using its handle 26. Index tabs 18 are attached to their corresponding pages, allowing an instructor or student to easily locate them amongst other similar pages. Though all pages in this embodiment are imprinted with letter or letter cluster indicia on the front only, the backs of said pages being blank, all index tabs 18 label their corresponding pages from front and back so that teachers and students can easily locate said pages.

Figure 2:
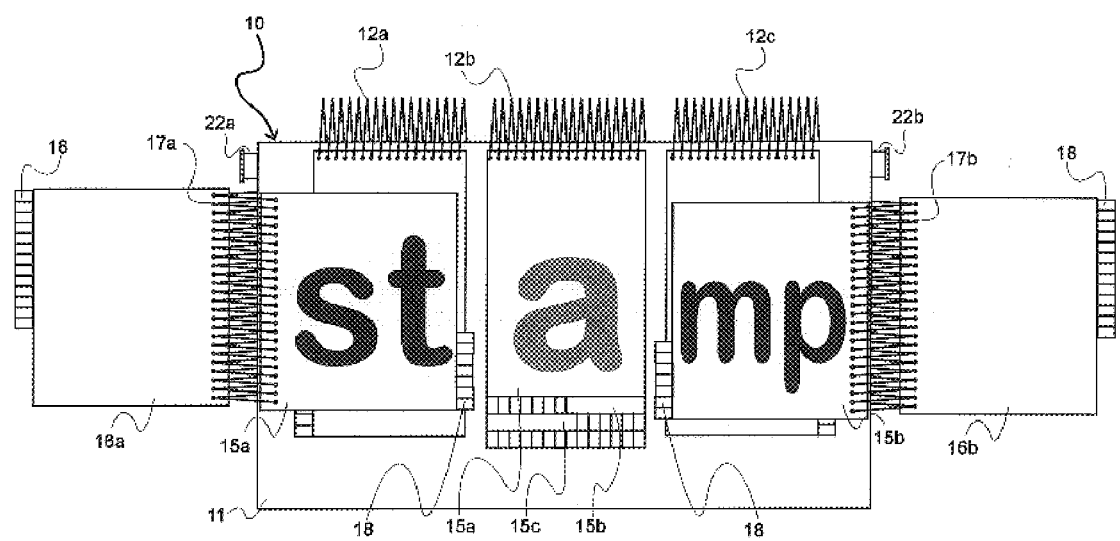
FIG. 2 is a plan view, showing side bound pages (consonant blends) covering the top bound, initial and final consonant pages.
Figure 3:
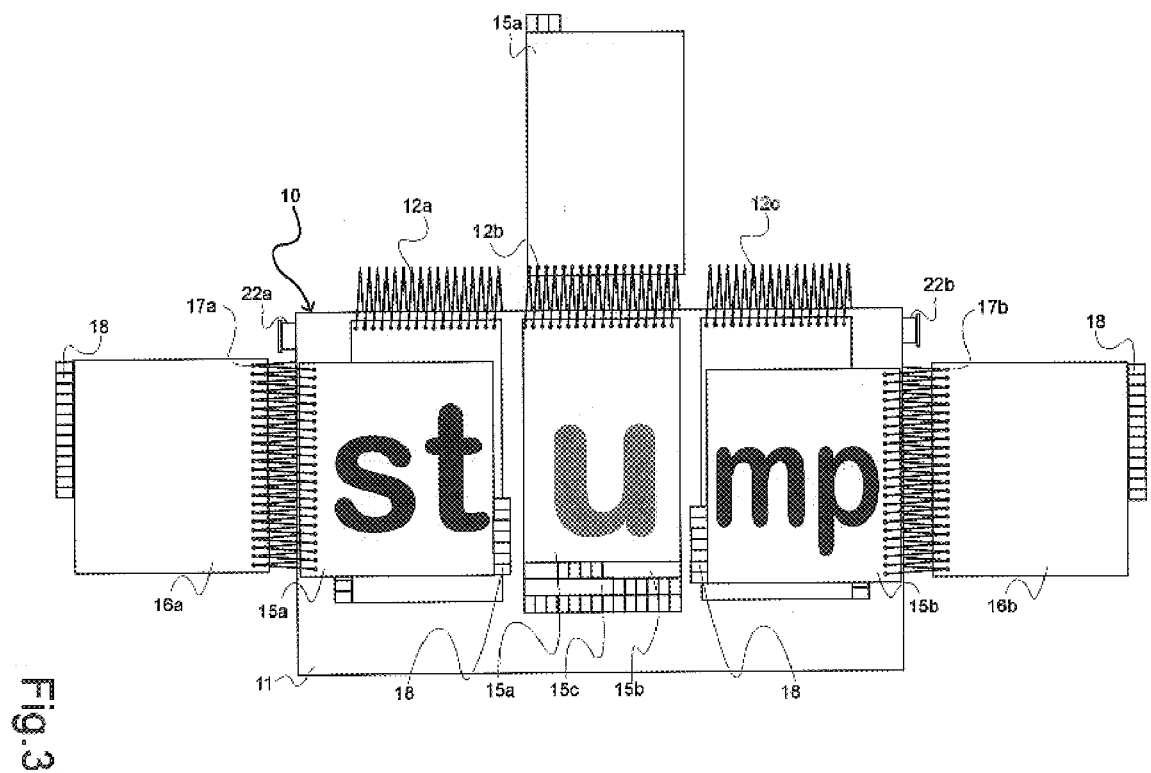
FIG. 3 is a plan view, similar to FIG. 2, but showing the rotation of some of the top bound (vowel section) pages.
Figure 4:
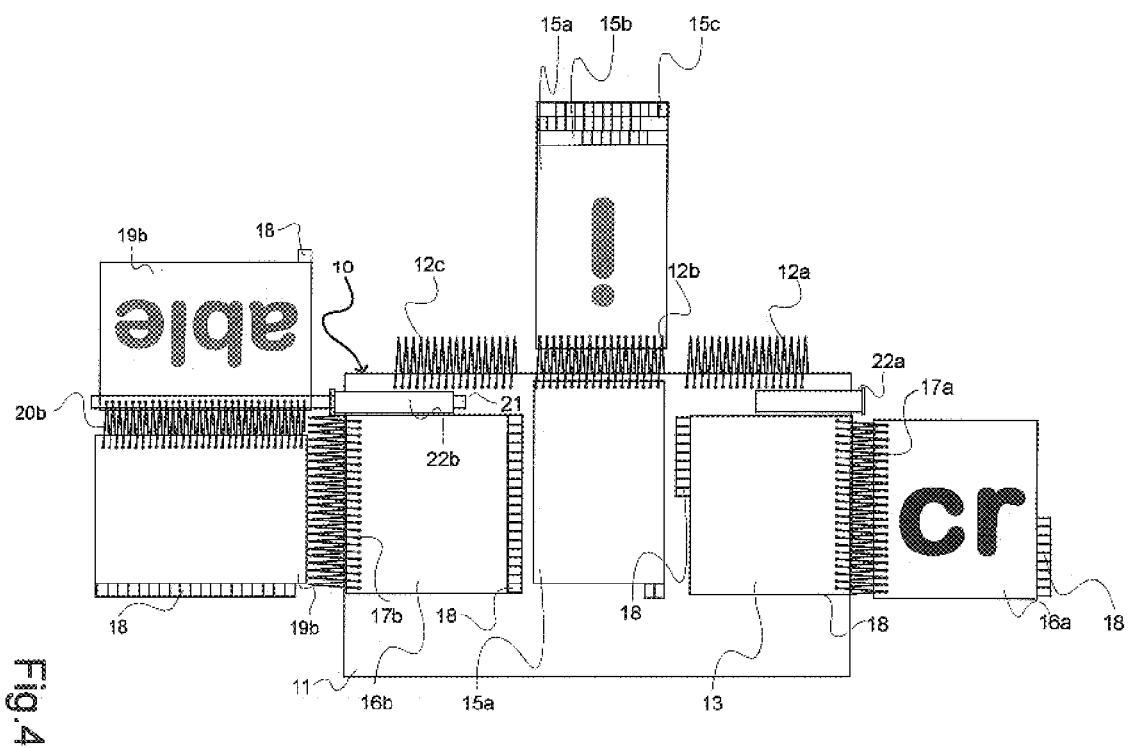
FIG. 4 is a rear plan view of the invention, showing pages which have been rotated behind the backing board and attachment of the suffix pages.

In a preferred embodiment, nine groups of flipbook pages have index tabs 18, being bound with spiral bindings. They include the initial consonant pages 13 and final consonant pages 14. The set of initial consonant pages includes pages showing the consonant digraphs th, ch, sh, wh, and ph. The set of final consonant pages includes pages showing the consonant digraphs th, ch, sh, ph, and gh. Also, rather than a single q, qu is shown within the initial and final sets of consonant pages, as q does not appear by itself in written English words. The sets of initial consonant pages and final consonant pages are attached to the backing board 11 with the left top spiral binding 12a and the right top spiral binding 12c, respectively. Between these is the vowel section. It consists of three groups of pages, one group in front of the next, which are attached to the backing board 11 with the center top spiral binding 12b. The front group in the vowel section are the single vowel pages 15a. Behind them, being slightly longer and thus extending lower, are the r-controlled vowel pages 15b. Behind them, and longer still, are the vowel team pages 15c. Their graduated lengths allow all three groups of pages to be seen. All pages attached with top spiral bindings are able to be vertically rotated about their bindings, so that said rotated pages are out of sight, behind the backing board 11. This is done to reveal those pages behind them in flipbook fashion. However, the pages being rotated in FIGS. 1, 2, and 3, and some of the pages in FIG. 4, are not shown fully rotated behind the backing board, as they would be in actual practice. They are depicted in a splayed position so that the directionality of their rotation will be apparent to the viewer. The initial consonant blend pages 16a and final consonant blend pages 16b are attached to the backing board via the left 17a and right 17b side spiral bindings. These pages rotate horizontally about the backing board 11. They are depicted in a splayed position, rather than being fully rotated behind the backing board 11, as they would be in actual use. This is to make their existence and directionality plain to the viewer. Prefix pages 19a and suffix pages 19b rotate vertically about their attachment rods 21 in flipbook fashion.

Figure 5:
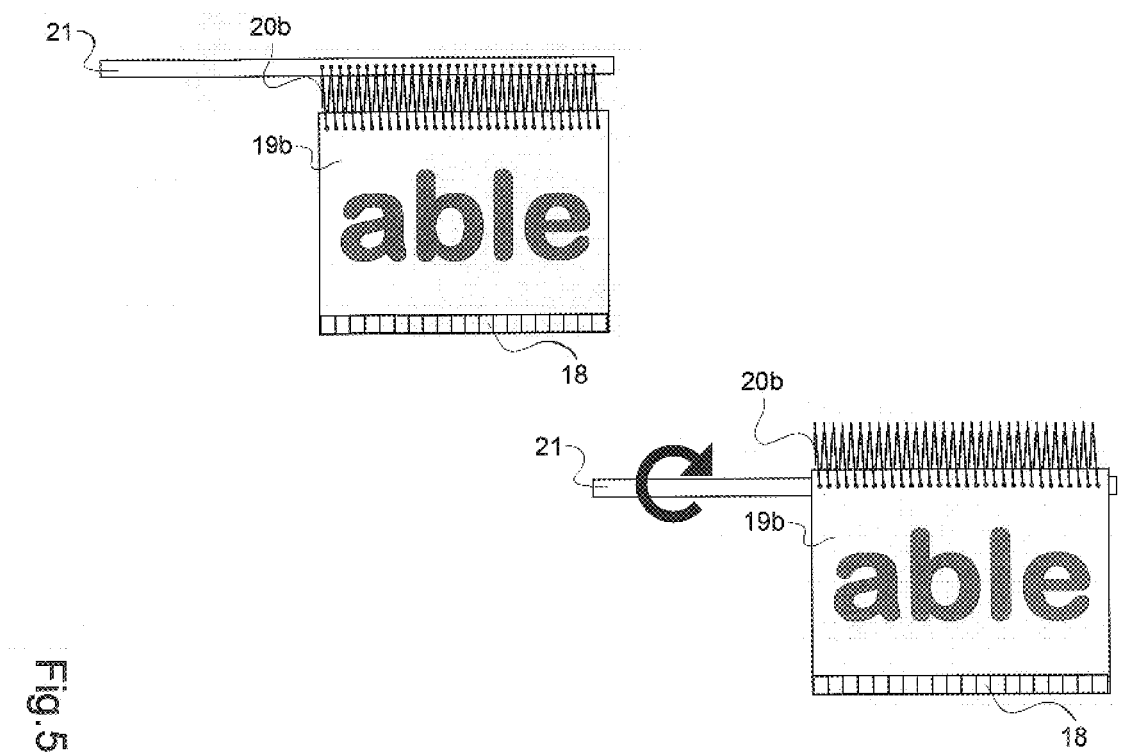
FIG. 5 illustrates the construction of the prefix and suffix page units which plug into the backing board of the main flipbook when needed.

In FIG. 1, the prefix and suffix page units are shown as if their spiral bindings are suspended from their attachment rods. This is to make their construction plain to the viewer. In actual use, the attachment rods are rotated on the spiral bindings to a position behind the pages, as depicted in FIG. 5. This allows front pages to be vertically rotated about the spiral binding, revealing pages which were formerly behind them in flipbook fashion. The attachment rods 21 of the prefix and suffix page units, then, are in the same position relative to their pages and spiral bindings, as the backing board 11 is to its top mounted pages and spiral bindings. Front pages rotate vertically on spiral bindings to a position behind them.

The two "silent e" pages 23, 24 and the schwa page 25 are single pages. They have no spiral binding or index tabs, and do not operate in a normal flipbook fashion. As occasion requires, while building various words, either of the "silent e" pages or the suffix page unit can be affixed to the right side of the flipbook. When needed, the prefix page unit can be affixed to the left side of the flipbook, as well. While working with an individual syllable, within a multisyllabic word, the schwa page can be used to indicate that the vowel in an unaccented syllable (as in the first vowel sound in alone or in the second syllable within happen) is pronounced with /ŭ/ (as in up).

Using the flipbook to substitute letters, and thus change words, can result in forming nonsense syllables. Changing cat to cak illustrates this. Some educational writers encourage a limited amount of nonsense syllable production for students, as this highlights their orthographic structure. The applicant recommends that teachers utilize lists of words they have previously generated when using this instructional tool.

Color-Coding

The preferred embodiment of this invention shows consonants, i.e. single consonants, consonant digraphs, consonant blends, and the r on r-controlled vowel pages, imprinted in blue. Vowels, i.e. single vowels, vowel teams, and r-controlled vowels, are imprinted in orange. An exception to this is silent letters and nearly silent letters. Silent consonants, within consonant blends, as seen in knot, wrist, and height, are imprinted only with black outlines, so that they appear ghostly on a white page. The r-controlled vowels, i.e. er, ir, and ur, are nearly silent letters. As such, they are imprinted with a black outline surrounding a hazy orange outline. Also, the "marvelous e" page shows its silent e imprinted in an orange and white starburst within a black outline, indicating that though it is silent—it has orthographic power over other vowels. The "not so marvelous e" page shows its silent e imprinted only with a black outline. The sets of prefix and suffix pages, however, are imprinted in green, as students are meant to learn them as letter units, rather than viewing them as compilations of vowels and consonants.

In the preferred embodiment, flipbook pages show only letters or letter clusters. Aside from their small index tabs and color-coding, there are no other indicia like pictures of representative objects or their written names. This is because the instructional device presented herein is specifically designed to teach students about the orthographic structure of written words, at the single-syllable level. Other benefits, like a surer sound/symbol knowledge or increased fluency rate or vocabulary growth, are secondary to this purpose. Therefore, the pivotal nature of vowels and vowel teams, within single-syllable words and syllables is highlighted, both by its color-coding and mechanical design. Featuring vowels and vowel teams only on the middle pages, with single consonant and consonant digraph pages flanking these on the left and right positions, and with consonant blend pages rotating about the left and right sides—to cover the single consonant pages, illustrates the centrality of vowels and vowel teams within orthographic patterns. That the silent e pages, and prefix and suffix pages, are externally attached to the sides of the flipbook further emphasizes this to students.

OPERATION OF THE INVENTION

This invention is an educational device and instructional methodology, designed to demonstrate the orthographic patterning of written words. It highlights the structure of how alphabetic letters are used to form written words, and is very specific to that curricular goal. Therefore, students' vocabulary development, expressive reading, or fluency rate, etc. are to be taught in other ways. The instructional methodology for utilizing said educational device is meant to promote a structuralist view of written words. This is complimentary to, but different than the meaning-based view of written words—which is a result of having learned oral language, and trying to transpose spoken words into their written form. Such a structuralist view is informed by Edward Fries' (1962) assertion that "structuralism not only requires us to abandon our word-centered thinking about language; it demands that in every aspect of language we must shift from an item-centered view to one that is structure-centered."

The preferred embodiment of said educational device is the flipbook described in this patent application. The methodology for its use is meant to:

(a) demonstrate abstract aspects of English orthography to students at a concrete, structural level;

(b) teach the orthographic patterns found in single-syllable English words and syllables;

(c) facilitate students' developing deep understandings of fundamental orthographic principles, as they manipulate the letters which form structural parts of written words, to form other written words;

(d) utilize synthetic and analytic phonics instruction, in both a parts-to-whole and whole-to-parts manner.

Accordingly, this instructional methodology is an interlocutor between what many educators feel are somewhat opposing forms of phonics instruction. An example of a synthetic, bottom-up (parts-to-whole) orientation can be seen in a student's blending the individual graphemes, [b], [u], and [g] together, to read the word, bug. Small bits of information have been correlated to arrive at a larger unit of meaning. An example of a top-down (whole-to-parts) orientation is exemplified in a teacher's asking, "How can you change bug into bag?" A known word is to be changed. In order to do that, a student must consider what is different between it and another known word. (Different vowels in the middle.) Then, the student must check his or her lexicon of sound/symbol correlations to make sure that u should be substituted with a.

In *The Literacy Dictionary*, Harris and Hodges (1995) note, "A phonics approach that gives many examples of a phonic pattern before arriving at the phonic generalization is an inductive method." Induction is "the process of determining principles by logic or observation from data; reasoning from part to whole," "a teaching-learning method in which specific examples are first examined to identify a common characteristic and then used to develop a generalization or rule." *The Literacy Dictionary* defines deduction as "the process of logical reasoning from principles to specific instances; reasoning from wholes to parts." The deductive method is "a teaching-learning method in which a generalization or rule is first considered and then applied to specific examples."

Individual students have varying preferred modalities and styles of learning. Ideally though, students can be supported in ways which facilitate their ability to use appropriate cognitive strategies in the situations they encounter, as the need arises. Students' learning to use both inductive and deductive reasoning skills, while they engage in structuralism, can be seen to be very worthwhile. While literacy, itself, is necessary for success in all academic subjects, this particular mental competence is also transferable to most (if not all) the types of learning students will need to engage in.

The preferred method of operating this educational device is for a teacher to form a written word on the flipbook, which conforms to the orthographic pattern to be taught. Said teacher then demonstrates the structural aspects of such words by rotating the flipbook pages, and attaching others as needed, to form other written words conforming to said orthographic pattern. It is important to teach one orthographic pattern at a time. Also, the applicant recommends that instruction utilizes a list of words, which have been generated previous to the lesson being taught. Accordingly, if the teacher is working with CVC words, said teacher might begin by arranging the flipbook pages so as to form cal pointing out that this word has a vowel with a consonant before and after it. The word, cal, can then be changed by substituting any of the letters found in the sets of flipbook pages used to form this pattern (consonant-vowel-consonant). Students will see that the blue colored consonants always flank an orange colored vowel in these words, and that any one of its component parts can be substituted with a like component part (consonants for consonants and vowels for vowels).

Having demonstrated this to students, a teacher should ask a student to direct him or her in forming another word on the flipbook, pat, for instance. Then, said teacher should ask another student, "Is that right? Sound out each of the letters for us." The student then vocally blends the sounds of p-a-t for the class. Another student is then asked, "How can pat be changed to mat?" Yet another student should be asked to vocally blend the sounds of the word produced, to see if it has been properly formed on the flipbook. Blending individual letter sounds (graphemes) together, to form or check the spelling of a written word is an inductive, synthetic phonics practice. Changing a word to form a similar but different word is a deductive, analytic phonics practice. Students should be taught in an alternating inductive/deductive fashion, to substitute initial consonants, then final consonants, and then vowels. Having become proficient at these operations, said students should be led to form words which are increasingly dissimilar—changing two or all three elements in such CVC words.

The use of first initial 16a, then final consonant blends 16b should follow this, introducing another orthographic pattern. Said teacher should discuss this with said students, pointing out the kinesthetic relationship of consonant blend pages' being rotated about their bindings 17a & 17b (from behind the backing board 11) to cover the single initial 13 and final 14 consonant pages. That the letters on consonant blend pages form a cluster (suggesting that they should be utilized together, as a unit) should be discussed—also that, with the exception of silent letters, they are blue. This color-coding indicates that the letter clusters imprinted on consonant blend pages can be used in the place of single consonant pages 13 & 14, but not for vowel pages 15a.

When said students have become proficient at utilizing consonant blends, vocally segmenting and blending their sounds, both substituting consonant blends for each other and substituting consonant blends for single consonants (and visa-versa), the "marvelous e page" 23 should be introduced and discussed with students—along with the "not so marvelous e" page 24. This illustrates yet another orthographic pattern. While continuing an inductive/deductive instructional approach, orthographic patterns should be covered in the following order:

CVC (consonant-vowel-consonant) as in cat, dog, hit, and beg (Consonant digraphs act as a single letter). thin, shut, mesh, rich CCVCC This generalized pattern allows for consonant blends either before or after the vowel, or in both positions. [CCVC, CVCC, or CCVCC]

Clam, flip, step, wing, bank, melt, crisp, clung, plant

CVCe (consonant-vowel-consonant-"silent e") By adding a "silent e" on the end, this pattern usually changes the mid vowel sound from short to long. "Marvelous e tells the vowel in the middle, 'You can say your name now.'" Pin is changed to pine, hat to hate, and not to note. Having worked with initial consonant blends, students are also shown that marvelous e does the same thing in CCVCe words and syllables, changing plan to plane and spin to spine.

However, not all words ending with "silent e" are equal (orthographically). Along with the marvelous e page, this instructional device also includes a not so marvelous e page. Come, love, and tense are words in which the mid vowels do not have a long sound. They are exceptions to the rule. Bring (being a CCVCC word) has a short vowel sound (i). Unfortunately, so does binge. "Sometimes not so marvelous e just hitches a free ride on the end of a word. Usually, though, it changes the s, c, or g in front of it, as marvelous e also can."

Without a "silent e," tense has a softer, voiced /s/ in tens.

The "silent e" in lance causes the c to represent an /s/ sound.

The "silent e" in binge causes the g to represent a /j/ sound.

"Not so marvelous e doesn't tell the vowel in the middle, 'You can say your name now.'"

Some orthographers refer to this differentiation with the terms "silent e" and "final e". This tends to confuse students, though, as "silent es" are at the end of words like "final es," and "final es" are also silent. The terms "marvelous e" and "not so marvelous e" appear less confusing to students. They also afford a humorous mnemonic to help students both understand this principle of word structure and develop specific spelling strategies for individual words.

CV (consonant-vowel) [Also, CCV] This pattern produces a long vowel sound as above. be, go, my, - - - spy, fly, cry The orthographic reason for this is that, reading left-to-right, a vowel not followed by a consonant represents its long sound. If it is blocked by a following consonant, it can only have its long sound if the consonant is followed by marvelous e.

VC (vowel-consonant) Accordingly, vowels followed by a consonant have a short sound [as in the CVC pattern].

on, if, as, it, up

XCVC (a generalized pattern which includes silent letters)

knot, wrist, deck, ditch, judge, thumb

V+r (vowel plus r) (Use the r controlled vowel pages). The "bossy r" controls the vowel sound in front of it. "It stands behind the vowel and says, 'Say my name, say my name!'" cart, fern, first, burst, fork Some vowels are more compliant than others. "The a is a wimp, it simply says /r/; e, i, and u try harder to resist and manage an /er/ sound; o comes closest to managing to hold on to its sound, with /or/."

Prefixes and suffixes—Commonly used prefixes and suffixes have been included in the prefix and suffix page units. They are colored green for two reasons. Firstly, their vowel/consonant configurations do not necessarily follow the orthographic patterns thus detailed and, secondly, they are used so often that students are encouraged to simply memorize their spellings and utilize them in unit form, as they would a consonant blend, therefore, they are neither colored orange not blue. Also, that they are attached to the flipbook in an external manner, forming words like reach+able and un+reach+able, highlights their orthographic (structural) functioning. Additionally, just as having both a "marvelous e" and a "not so marvelous e" page aids students regarding silent e concepts, that the attachment rod 21 for the suffix pages 19b cannot be plugged into the right receptacle 22b if said receptacle already holds the attachment rod 21 for a silent e page presents instructional opportunities. Students can be shown that a silent e is removed from its word when ing and tion are added. However, this is not always so when adding ly or able to a word. A teacher's physically holding the set of suffix pages in line with the other letters (including the silent e) in such cases, helps students visualize and memorize the difference—thus supporting their spelling skills.

CVVC (vowel teams)

[ee, oa, ui, ie] These vowel teams are consistent in their sounds.

seen, feet, coat, soap, suit, fruit, thief, shield

[ai-ay, au-aw, oi-oy] These vowel teams are paired. The vowel combinations ending with y or w are generally found at the end of a word—those ending with i and u are in the middle.

pain—pay, rain—ray, train—tray, and sail—say

Paul—paw, launch—law, and jaunt—jaw boil—boy, join—joy, and soil—soy

[ow/ow, oo/oo, ei/ei, ey/ey, ew/ew] Some vowel teams can represent either of two different sounds. (The ew/ew sounds are very subtle; the first is like "you" and the second lacks a ŭ, as in "chew.")

cow—slow, down—show, town—grow shoot—shook, moon—look, zoo—book freight—seize, weight—deceive, vein—either they—key, grey—monkey, hey—valley few—grew, mew—new, pew—chew The ea vowel team can represent any of three different sounds, as in eat, bread, and steak.

seal—sweat—break meat—spread—great speak—thread—steak

Vowel teams are the last orthographic pattern to be taught for an important reason. They are the most confusing letter combinations for students to learn. However, by the time the other orthographic patterns have been sufficiently taught, most students will have encountered enough CVVC words in their reading to have memorized some of them. This affords a familiar foundation on which to build additional orthographic understandings—as students see how these known words can be formed on the flipbook and substituting their structural parts can form less familiar words in the same orthographic pattern.

Nine Groups of Multiple Pages

| Initial consonant pages | | | |
|---|---|---|---|
| b | k | s | th |
| c | l | t | ch |
| d | m | v | sh |
| f | n | w | wh |
| g | p | x | ph |
| h | qu | v | |
| j | r | z | |

| Final consonant pages | | | |
|---|---|---|---|
| b | k | s | th |
| c | l | t | ch |
| d | m | v | sh |
| f | n | w | ph |
| g | p | x | gh |
| h | qu | y | |
| j | r | z | |

| Single vowel pages | | |
|---|---|---|
| a | i | u |
| e | o | y |

| r - controlled vowel pages | | |
|---|---|---|
| or | er | air |
| ar | ir | ear |
| | ur | |

| Vowel team pages | | | |
|---|---|---|---|
| ee | ay | oy | ey |
| ai | au | oo | ew |
| oa | aw | ow | ea |
| ui | oi | ei | ou |

| Initial consonant blend pages | | | |
|---|---|---|---|
| bl | | | |
| cl | fr | sp | |
| fl | gr | st | kn |
| gl | pr | sw | gn |
| pl | tr | spl | gu |
| sl | sc | spr | sc |
| br | sk | str | sch |
| cr | sm | thr | sw |
| dr | sn | tw | wr |

| Final consonant blend pages | | | |
|---|---|---|---|
| sp | pt | bt | ll |
| sk | nt | ck | mb |
| nk | ft | dge | tch |
| ng | ct | ght | tle |
| nd | lt | gn | w |
| nch | lp | gue | |
| mp | lm | ld | |
| st | lf | lk | |

| Prefix pages | | | |
|---|---|---|---|
| a | en | im | pro |
| com | es | in | re |
| con | ex | per | un |
| de | | pre | |

| Suffix pages | | | |
|---|---|---|---|
| able | es | il | ness |
| age | est | ing | ous |
| al | er | ish | s |
| ary | ful | ive | sure |
| ed | i | le | tion |
| en | ible | ly | y |
| ent | ic | ment | |

| Single pages |
|---|
| Marvelous e page |
| Not so marvelous e page |
| Schwa page |

CONCLUSION—RAMIFICATIONS AND SCOPE

The present invention is an improvement over prior art, both in its features as an educational device and in the instructional methodology for its use. Utilizing the format of a flipbook, as in the preferred embodiment, shows an improvement over sets of letters, such as "A–Z Classroom Letter Center" (TT212) and letters and conjoined letter clusters, such as the Touchphonics™ system and "Phonics Magnets—Complete Set" (RR480X), in its compactness, ease of use as an instructional tool, and less susceptibility to the misplacement or loss of its individual pieces. The kinesthetic design features of the preferred embodiment show an improvement over other flipbooks, regarding orthographic instruction, such as "Phonics Flip Books" (AA902), *I Can Spell: Words with Three Letters* (Nilsen, 1998), and the flipbook described in U.S. Pat. No. 5,788,503 of Shapiro et al. Most (if not all) phonetically spelled English single-syllable words and syllables can not only be illustrated, but shown in their orthographically correct patterns, highlighting consonants, vowels, consonant blends, consonant digraphs, vowel teams, silent and nearly silent letters, along with prefixes and suffixes. That silent e is represented either with the "marvelous e" page or "not so marvelous e" page, and the schwa page indicates unaccented vowel sounds, further clarifies English orthography for students.

The kinesthetic relationships of various pages and sets of pages within the preferred embodiment of this invention are purposefully meant to indicate or suggest the orthographic relationships of the letters and letter clusters imprinted on those pages. The color-coding of said preferred modality shows an additional improvement over prior art, as it further highlights orthographic patterns and letter relationships—offering students more comprehensive support than the other educational devices discussed herein (excepting the Touchphonics™ system) while being less complicated than the Touchphonics™ system. The letters and letter clusters of the Touchphonics™ system are able to be physically placed anywhere, in any order, thus indicating a need for color-coding which denotes the relative placement of said letters and letter clusters, while the flipbook pages described herein cannot be wrongly aligned within the written words formed. Therefore, its color-coding can simply highlight orthographic patterns and letter relationships, rather than needing to also indicate their relative placement; an obvious additional improvement.

The methodology for using the present educational device is an inherent part of this invention. It represents a further improvement over prior art. The applicant has seen that promoting a structuralist view of written words has significantly helped numerous students, facilitating their literacy instruction. Utilizing the strengths of both synthetic and analytic phonics in an inductive/deductive manner is a dramatic educational development, which supports students' using their preferred learning strategies while encouraging them to use others, as appropriate. The teaching of orthographic patterns, beyond CVC, is becoming more accepted among educators. The instructional methodology detailed herein, which utilizes the flipbook described, offers teachers and students a vehicle toward this end.

Although, the description of the preferred embodiment of the present invention contains many specificities, these should not be construed as limiting its scope. Promoting a structuralist view of written words by demonstrating the manipulation of letters and letter clusters according to orthographic patterns, can be achieved using various modalities, like video, and animated presentations or a computer program, etc. Also, while said preferred embodiment is a flipbook which illustrates English orthography, the structure of any alphabetic language can be illustrated using a similar flipbook which is designed specifically for that language. The elements which guide the design, construction, and use of the present invention have many possible modalities. Thus, the scope of this invention should be determined by the appended claims and their legal equivalents, rather than by the examples given.

I claim:

1. An educational flipbook device for teaching orthographic structure of written words and syllables comprising:

a plurality of sets of pages with each set comprising a plurality of pages;

a backing board having a top, bottom, left and right sides with some of said plurality of sets of pages attached to said backing board through a plurality of spiral bindings, wherein each spiral binding attaches at least one set of pages to said backing board;

each page of said plurality of sets of pages comprises indicia located on the front face of each individual page, wherein said individual pages can either be displayed, rotated out of sight behind said backing board or covered by other pages;

said spiral bindings attaching said sets of pages located along the left top, center top, right top, left side and right side of said backing board, the spiral bindings along the top of said backing board allowing the pages attached thereto to rotate vertically while the bindings along the left and right sides of said backing board allowing the pages attached thereto to rotate horizontally from the front of said backing board to behind said backing board;

the pages bound along the top of said backing board being situated in three positions, left top-bound pages, center top-bound pages, and right top-bound pages;

said left and said right side-bound pages and said left and said right top-bound pages positioned on said backing board such that said left and said right side-bound pages and said left and said right top-bound pages are aligned so that one can cover or supersede the other;

said plurality of sets of pages bound to said backing board such that each page is able to rotate about the respective spiral binding so that said indicia located on their faces appears in a side by side readable relationship displaying a written word or syllable which can be altered by rotating other pages into place in a flipbook fashion;

a schwa display comprising a single first page having indicia on the front face of said page and affixed to a vertical handle, which can be displayed by holding said handle behind the flipbook so that said indicia of said single first page appears above one of the other pages of the plurality of sets of pages displayed by the flipbook;

a plurality of attachment rods with some of the attachment rods having a single page attached thereto and other attachment rods having the remainder of said plurality of sets of pages attached thereto through means of a spiral binding enabling the indicia shown on the front of individual pages of said plurality of sets of pages to be displayed or vertically rotated behind other pages in a flipbook fashion;

a left receptacle and a right receptacle mounted to the backing board allowing said attachment rods to be affixed to said backing board for the purpose of displaying said at least one page, wherein some of the attachment rods may be attached to only the left receptacle and other of the attachment rods may be attached only to the right receptacle;

an index tab having a front and back affixed to each page of the plurality of pages of said plurality of sets of pages such that an individual page can be readily located, wherein said index tab comprises indicia located on said index tab front and said index tab back such that said index tab indicia is the same as the indicia located on the face of the page which the index tab is affixed to so that the respective page can be located among other pages either in front or behind the backing board.

2. An educational flipbook device of claim 1, wherein indicia of the set of pages bound to the left side of said backing board are letter groupings of initial consonant blends;

indicia of the set of pages bound to the right side of said backing board are letter groupings of final consonant blends;

indicia of the set of pages bound to the left top of said backing board are letter groupings of initial consonants and initial consonant digraphs;

indicia of the set of pages bound to the right top of said backing board are letter groupings of final consonants and final consonant digraphs;

the set of center top-bound pages being further divided into three additional sets of pages with each additional set having a graduated length respective the other additional sets, wherein the shortest of the additional sets comprises indicia of letters which are single vowels, the longest of the additional sets comprises indicia of letter groupings which are vowel teams, the set with the intermediate length comprises indicia of letter groupings which are r-controlled vowels;

indicia of the set of pages bound to an attachment rod for mounting in the left receptacle being letters and letter groupings of prefixes;

indicia of the set of pages bound to an attachment rod for mounting in the right receptacle being letters and letter groupings of suffixes;

a "marvelous e" display comprising said one of the single pages attached to an attachment rod for mounting to the right receptacle and having indicia on the front face thereof representing "marvelous e";

a "not so marvelous e" display comprising said another of the single pages attached to an attachment rod for mounting to the right receptacle and having indicia on the front face thereof representing "not so marvelous e".

3. An educational flipbook device of claim 2, a color-coding system for helping to determine orthographic elements in written words and syllables, wherein the indicia representing a schwa is black, indicia corresponding to silent letters being white with a black outline, indicia corresponding to nearly silent letters being mostly white with a fogging of orange or blue coloring and outlined in black, indicia displayed on pages corresponding to prefixes and suffixes being green, indicia representing "marvelous e" being white and orange starburst with black outline, indicia representing "not so marvelous e" being white with black outline, the remainder of vowel letter indicia being orange and the remainder of consonant letter indicia being blue.

* * * * *